Figure 3:
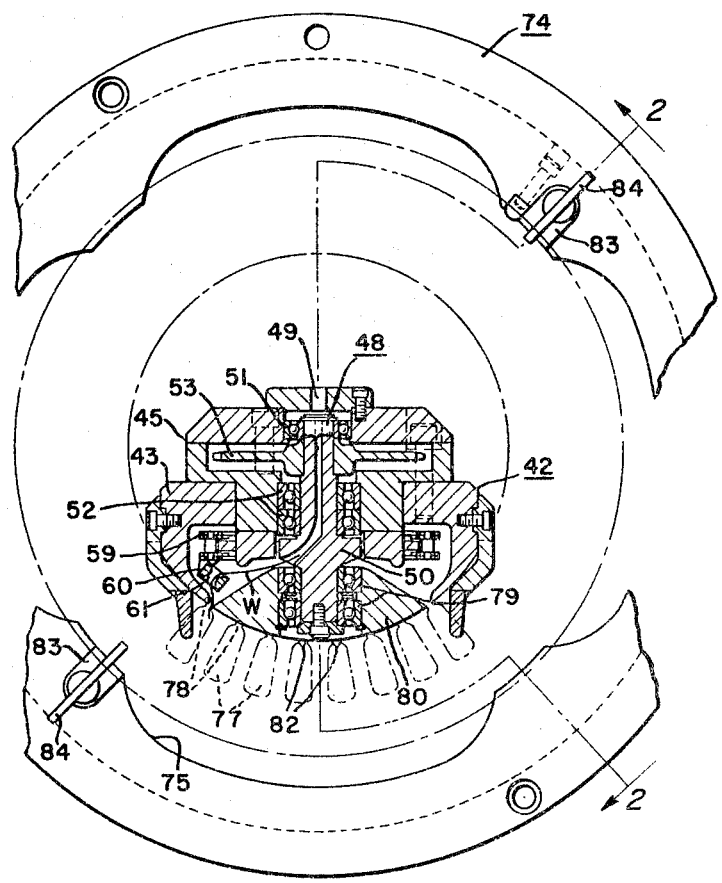

Dec. 13, 1966     P. B. GREENE ETAL     3,291,401
POLYPHASE STATOR WINDING APPARATUS
Original Filed Dec. 4, 1962     5 Sheets-Sheet 1
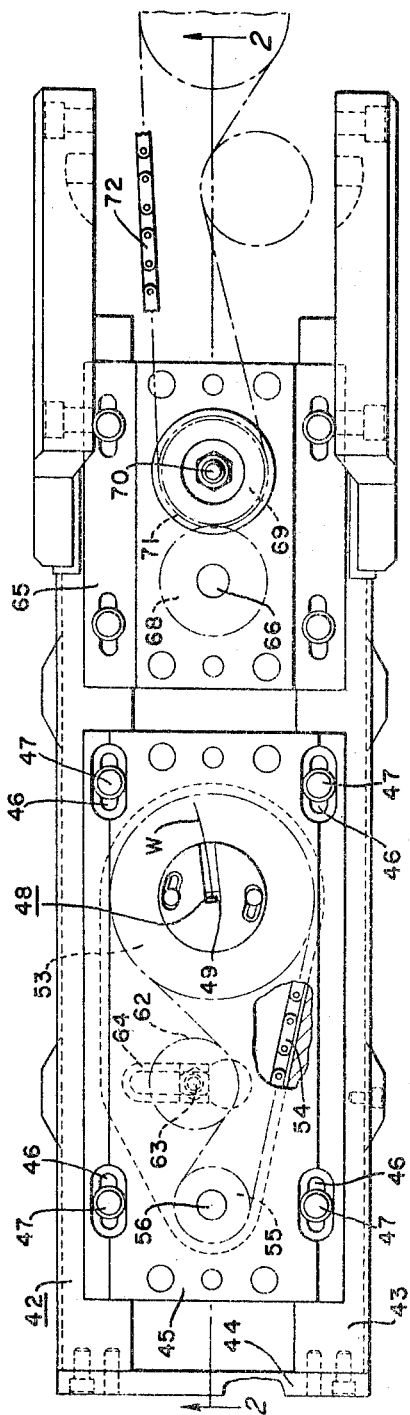
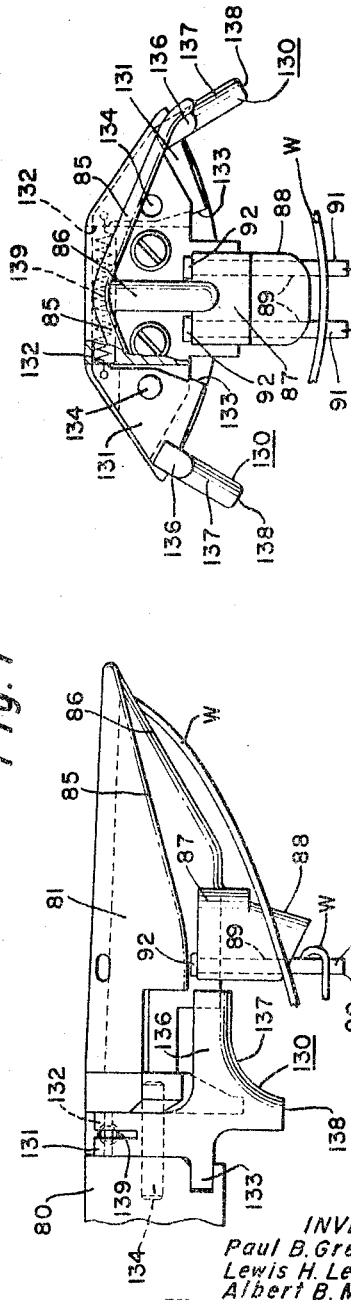
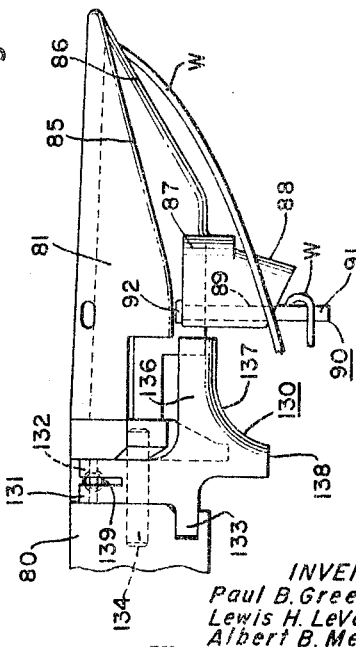
INVENTORS
Paul B. Greene
Lewis H. LeValley
Albert B. Mewhinney
Emmet C. Nevin
BY Albert H. Reuther
Attorney

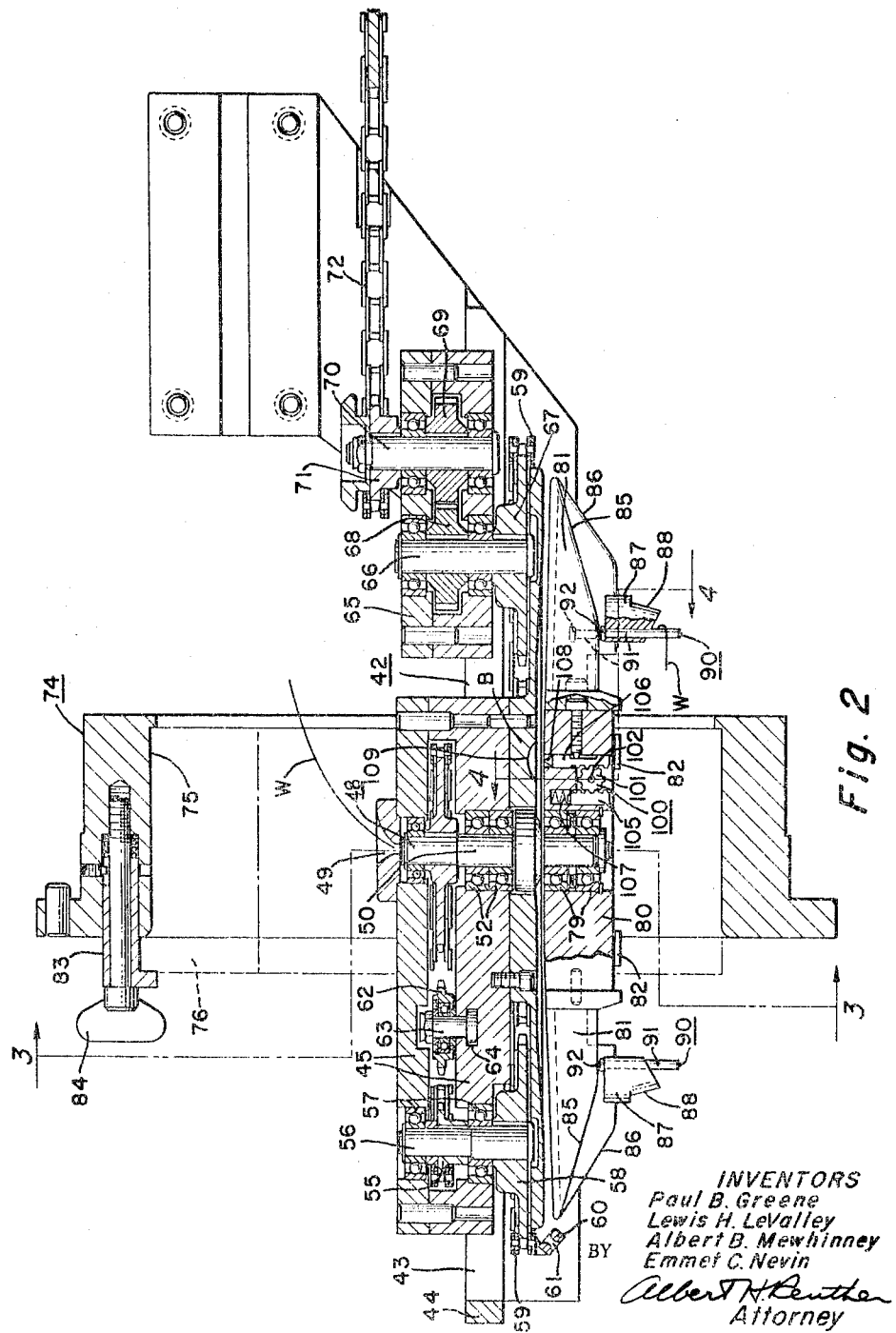

Dec. 13, 1966    P. B. GREENE ETAL    3,291,401
POLYPHASE STATOR WINDING APPARATUS

Original Filed Dec. 4, 1962    5 Sheets-Sheet 3

INVENTORS
Paul B. Greene
Lewis H. LeValley
Albert B. Mewhinney
BY Emmet C. Nevin Albert H. Reuther
Attorney

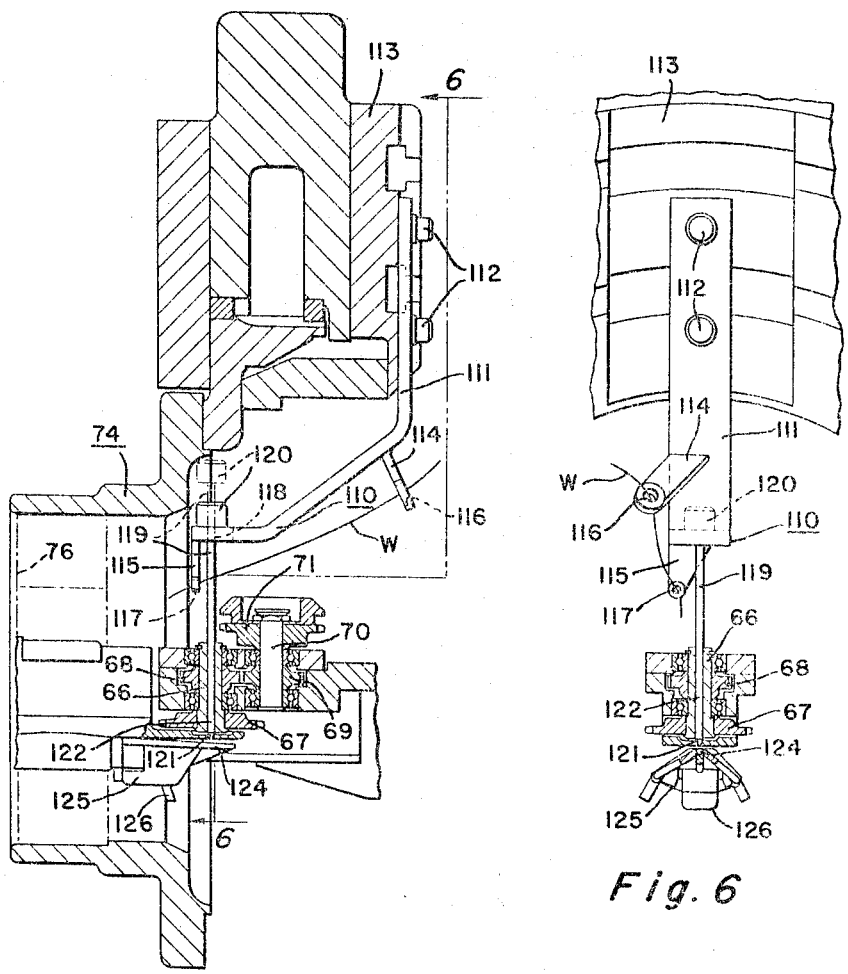

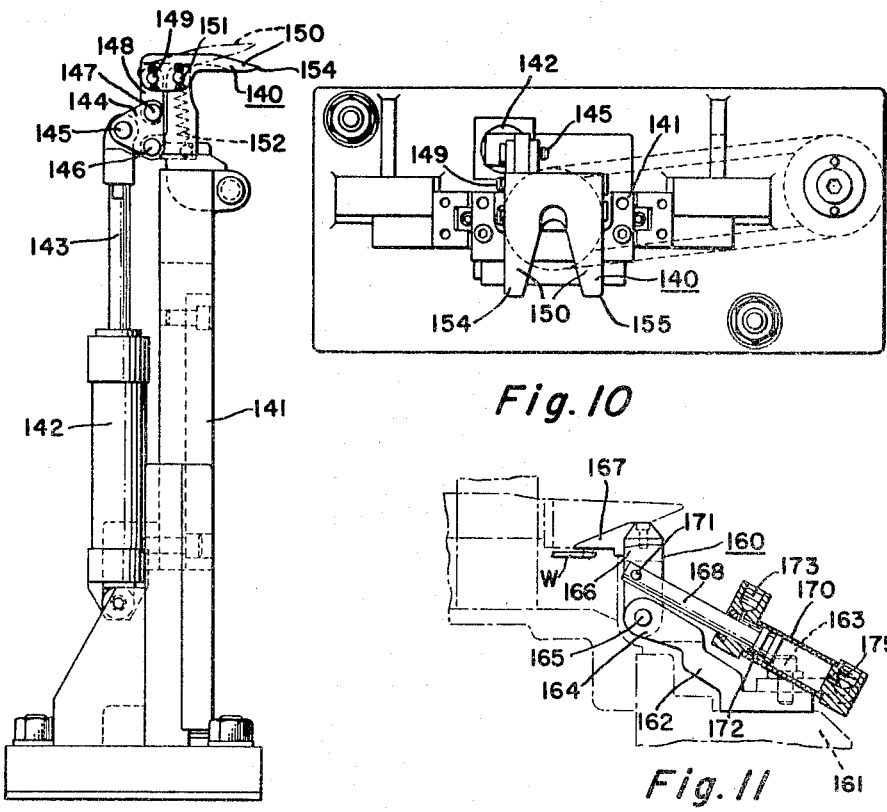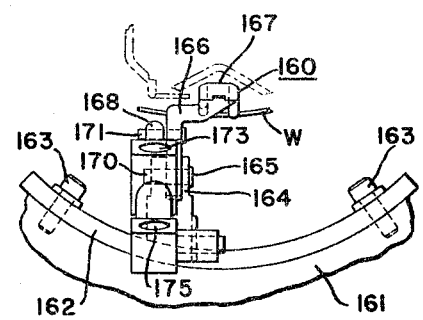

United States Patent Office 3,291,401
Patented Dec. 13, 1966

3,291,401
POLYPHASE STATOR WINDING APPARATUS
Paul B. Greene, Lewis H. Le Valley, Albert B. Mewhinney, and Emmet C. Nevin, Dayton, Ohio, assignors to General Motors Corporation, Detroit, Mich., a corporation of Delaware
Original applications Dec. 4, 1962, Ser. No. 242,236, now Patent No. 3,210,020, dated Oct. 5, 1965, and Nov. 2, 1964, Ser. No. 408,040. Divided and this application Oct. 7, 1965, Ser. No. 493,629
6 Claims. (Cl. 242—1.1)

This is a division of disclosure in parent application Ser. No. 242,236, filed Dec. 4, 1962, now Patent 3,210,-020, Greene et al., issued Oct. 5, 1965, and an earlier copending divisional application Ser. No. 408,040, filed Nov. 2, 1964.

This invention relates to features in combination with wire winding apparatus, and more particularly, to refinements and improvements for a stator coil winding machine of the type disclosed by Patent 2,988,291, Greene et al., issued June 13, 1961 and belonging to the assignee of the present invention.

An object of this invention is to provide retractable interlocking means to prevent lateral shifting and turning of a cantilever winding head structure provided with chain-driven wire-guiding means therewith.

Another object of this invention is to provide a stator coil winding head structure having opposite wire-guiding shoe portions to facilitate progressive placement of conductor coils in stator slots from which end turns of coils extend and are formed by at least one of a pair of vertically retractable pin-like posts around which the conductor is guided and is adapted to form end turns therewith free of damage to the conductor coil end turns previously wound.

Another object of this invention is to provide a stator coil winding head structure having opposite wire-guiding shoe portions each provided with diverging edging at least a portion of which is defined by separate pivotal hinge-like members remote from each other in pairs though each having a triangular main body portion with a pair of stops to limit angular pivotal movement as to the shoe portion as well as having a substantially L-shaped curved guide edge portion extending transversely of the triangular main body portion and complementing the edging of each side of the shoe portion, each substantially L-shaped curved guide edge portion being displaceable during placement of wiring so as to enhance generally even distribution thereof into stator slots.

A further object of this invention is to provide a fluid-actuated pivotal-linkage coil hold-down means on one side of a stator fitted to a stator coil winding machine and adapted to move to an on-center positioning for pull-down of coil end turns to facilitate placement of subsequently wound coils and end turns thereof.

Further objects and advantages of the present invention will be apparent from the following description, reference being had to the accompanying drawings wherein preferred embodiments of the present invention are clearly shown.

Figure 4:
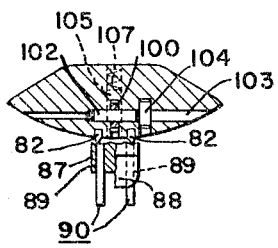

In the drawings:
FIGURE 1 is a plan view of a cantilever winding head structure having features in accordance with the present invention.
FIGURE 2 is a cross-sectional view taken along line 2—2 in FIGURE 1.
FIGURE 3 is a cross-sectional view taken along line 3—3 in FIGURE 2.
FIGURE 4 is a cross-sectional view taken along line 4—4 in FIGURE 2.
FIGURE 5 is a partially sectioned side view of a modified winding head structure having further features in accordance with the present invention.
FIGURE 6 is a cross-section view taken along line 6—6 in FIGURE 5.
FIGURE 7 is a side view of another embodiment of a wire-guiding shoe portion usable with the winding head structures of the foregoing views.
FIGURE 8 is an end view of the wire-guiding shoe portion of FIGURE 7.
FIGURE 9 is a side view of a fluid-actuated pivotal-linkage coil hold-down means for use on relatively large stator coil winding machine equipment having features in accordance with the present invention.
FIGURE 10 is a top view of the coil hold-down means of FIGURE 9.
FIGURE 11 is a side view of another fluid-actuated pivotal-linkage coil hold-down means for use on relatively smaller coil winding machine equipment having features in accordance with the present invention.
FIGURE 12 is an end view of the coil hold-down means of FIGURE 11.

Polyphase windings generally require placement of more conducting material or wiring into radially-slotted magnetic stator core means which can be formed by a stack of metal laminations aligned axially relative to each other. Recently there has been a trend toward compactness of dynamoelectric machine structures and such a trend results in increased difficulty as to placement of conductor material or wiring into slots of slotted magnetic stator core means adapted for polyphase dynamoelectric machines. Furthermore, there is a need for increased mechanization of polyphase winding operations so as to avoid loss of time and considerable expense involved in manual operation previously known for accomplishing placement of conductor material or wiring for polyphase winding of stator means. However, problems encountered in providing for machine winding of polyphase stator means differ somewhat from solutions provided for mechanical and machine placement of conductor material or wiring relative to slotted stator means generally. Therefore, refinements and improvements were made for a stator coil winding machine disclosed basically in a Patent 2,988,291, Greene et al., issued June 13, 1961 and belonging to the assignee of the present invention. This disclosure of Patent 2,988,291, Greene et al., was also supplemented in accordance with teaching of a copending application Ser. No. 11,654, Greene, filed Feb. 29, 1960, now Patent 3,129,491, Greene, issued Apr. 21, 1964 relating to insulating cutting and insertion mechanism in combination therewith as well as a copending divisional application thereof Ser. No. 145,418, Greene, filed Oct. 16, 1961, now Patent 3,129,499, Greene, issued Apr. 21, 1964, and directed to positive driving generaly for a wire placing guide means. Both of these copending applications belong to the assignee of the present invention and features disclosed in this application can be used with structures previously described and illustrated in these earlier disclosures.

Thus, in FIGURE 1 there is illustrated a plan view of a cantilever winding head portion or structure generally indicated by numeral 42 and adapted to be movable into and out of engagement with an inner periphery of an annular slotted stator means or magnetic core subject to indexing movement as disclosed in Patent 2,988,291, Greene et al. This winding head structure 42 includes an outer frame 43 having a transverse end portion 44 as well as a longitudinally adjustable bracket 45. The bracket 45 is provided with plural slots 46 through which suitable fastening means such as indicated by reference numeral 47 in FIGURE 1 can be adjustably fitted therewith in accordance with disclosure of copending applications Ser.

No. 11,654, Greene, and Ser. No. 145,418, Greene, now Patents 3,129,491, Greene, and 3,129,499, Greene, respectively, noted earlier. As can be seen in views of FIGURES 1 and 2 as well as in the aforementioned earlier disclosures, such bracket means 45 can be fitted with a snorkel member generally indicated by numeral 48 having a central guide passage for wiring or conductor means. This guide passage is indicated by numeral 49 and can include a laterally outwardly or radially extending extension thereof to facilitate movement of conductor material or wiring therethrough. This passage 49 can extend through an axial body portion 50 of the snorkel member 48 as indicated in FIGURE 2 such that suitable bearing means 51 and 52 press fitted in an annular opening between the body portion and bracket 45 can permit movement of the snorkel member 48 rotatably about a complete 360° path about the axis of body portion 50 thereof. A sprocket or gear means 53 having peripheral teeth engaged by a link chain means 54 can be carried to be movable relative to the bracket 45 as permitted by journalling of the bearings noted earlier. The chain means 54 provides a positive driving connection to the gear member or sprocket 53 and snorkel means 48 by way of a further sprocket or gear means 55 carried on a shaft portion 56 suitably journalled by bearings 57 and carrying another sprocket or gear means 58 having another chain means 59 with a wire-guiding eyelet 60 including a passage 61 therethrough carried by the chain means 59 as indicated in FIGURE 2. The chain 54 can be adjusted for proper engagement between sprockets 53 and 55 by an adjustable gear means 62 journalled relative to a suitable support subject to variable positioning in accordance with access to a fastening means 63 movable in an undercut groove 64 in the bracket 45 which can be divided into separable cover and main body portions for assembly purposes.

A further bracket means 65 visible in views of FIGURES 1 and 2 can be also adjustably positioned along the frame 43 or an extension thereof so as to provide rotatable journalling and support for a shaft portion 66 that carries a sprocket or gear means 67 engaged by the chain 59 as well as a gear means 68 in mesh with further gear means 69 carried by a suitably journalled shaft portion 70 having a sprocket 71 driven by a chain means 72 in a manner described more fully in the disclosure of Patent 2,988,291, Greene et al.

The winding head structure 42 as well as the snorkel member 48 can also be seen in the view of FIGURE 3. In FIGURES 2 and 3 there is indicated an annular support means generally indicated by numeral 74 and provided with a radially inner recess 75 to receive a stator means 76 having radially inwardly located slots 77 therein. These slots 77 have inner openings 78 through which conductor material or wiring must be fed by way of the passage 61 in the eyelet 60 and the central passage 49 of the snorkey member 48 so as to permit machine-operated placement of such conductor material or wiring as coils and windings of a polyphase stator winding assembly on a dynamoelectric machine. As can be best seen in views of FIGURES 2 and 3, the body portion 50 of the snorkel member 48 at a lower end thereof is fitted with bearing means 79 to provide journalling support for a central or intermediate portion 80 of a guide shoe means that further includes opposite end portions 81 substantially identical to each other and secured to the intermediate portion 80 by a suitable fastening means. The intermediate portion 80 can include at least a pair of downardly extending projections 82 indicated in FIGURE 3 and these projections 82 can fit complementary to inner slot openings such as 78. These projections 82 extend longitudinally of the inner slot openings 78 and it is to be understood that a stator means 76 is held to the annular support 74 by a clamp means 83 with an adjustable fastener 84 as indicated in views of FIGURES 2 and 3. Thus, the stator means 76 is held axially relative to the recess 75 and the winding head structure 42 is positioned longitudinally thereof in a cantilever arrangement of support from a main body, frame or base of the stator winding machine to which the support 74 is fixed. The winding head structure 42 can be moved into and out of engagement with the inner periphery of the stator means 76 as described more fully in Patent 2,988,291, Greene et al., though for polyphase stator winding apparatus, it has been found that the intermediate shoe portion 80 carrying the opposite end shoe portions 81 can have a tendency to move or rotate in such a way that the projections 82 are not always longitudinally in alignment with a particular pair of inner slot openings 78. Proper positioning of the wire guiding shoe portions 80–81 is necessary to assure placement of conductor material or wiring W into predetermined pairs of arcuately separated slots in the stator means. This proper longitudinal alignment of the wire guiding shoe portions 80–81 is also essential for formation of opposite end turns of wiring due to engagement thereof along laterally opposite peripheral edging 85 and central rib 86 of the winding shoe end portion 81 visible in views of FIGURES 2, 7 and 8 of the drawings. A lower or downwardly extending projection 87 including a rounded or curved end guide surface 88 engageable by wiring W can be provided on each of the wire guiding end portions 81. Each extension 87 can have a pair of parallel passages 89 therethrough. Post-like pin means generally indicated by numeral 90 can be provided to include a main body portion 91 and an upper enlarged head 92 to be displaceable as indicated in a right-hand portion of the view of FIGURE 2 whenever a lower free end of the pin means 90 engages previously wound wiring W of a coil of an earlier wound phase portion of a stator means for a polyphase dynamoelectric machine. It has been found that in placement of wiring W into the stator slots that at most, one or the other of such displaceable pin means will be caused to be deflected upwardly by previously wound wiring W such that at least one post is left to project downwardly and to assure generally triangular formation of end turns of wiring W into coils of a polyphase winding on a stator means for a dynamoelectric machine. The contoured or curved surfacing 88 of the extensions 87 assures passing of the wiring W to engage either of the post-like pin means 90 and machine placement of such wiring W can be accomplished successfully by turning of the wiring about one or both of the reciprocable and displaceable pin means 90. Weight of the pin means and clearance for the axial body 91 thereof relative to the passages 89 is such that the pin means tend to be positioned downwardly under normal condtions except for displacement upon engagement of an end of such a pin means against a previously wound end turn of a coil of wiring or conductor material.

On larger polyphase stator winding apparatus there can be provided a retractable interlocking means generally indicated by numeral 100 in views of FIGURES 2 and 4. This retractable interlocking means 100 can include a gear 101 rotatably journalled on a pin or shaft 102 inserted through a passage 103 in the intermediate shoe portion 80. The passage 103 can be blocked or closed off by a transverse dowel 104 as indicated in FIGURE 4. The gear 101 is located between a pair of oppositely movable rack or geared portions 105 and 106 as can be best seen in the view of FIGURE 2. The rack portion 105 is biased downwardly by a spring means 107 visible in views of FIGURES 4 as well as 2 such that normally the spring means 107 urges the rack portion 105 downwardly to effect displacement of the rack portion 106 upwardly in a couple-like arrangement resulting in interlock or engagement of an upper end 108 in a dome-like recess 109 of a transverse body portion B carried by the frame 43 as indicated in FIGURE 2. Movement of the winding head structure 42 radially into engagement with an inner periphery of a stator means results in engagement of a lower end of the rack portion 105 against an inner periphery of the stator means thereby causing a disengagement of the upper end 108 of the rack portion 106 which is thus freed from centralizing engagement as to the dome-like recess 109 thereby permitting free alignment of the projections 82 relative to inner slot openings 78. As soon as the winding head structure 42 is retracted radially inwardly away from engagement with the stator means, the spring means 107 again urges a rack portion 105 downwardly thereby providing a translation of this force through the rotatable gear 101 that urges the rack portion 106 upwardly to have the free end 108 interlock with the dome-like recess 109 of the transverse body portion B thereby effecting an interlock or engagement between the wire-guiding shoe means 80-81 and the winding head structure 42. This interengagement or interlock assures against undesirable free turning of the wire guiding shoe portions 80-81 relative to the winding head structure 42 whenever the latter is retracted from engagement with a stator means such as 76. Thus, the wire guiding shoe portion structure 80-81 can be centered relative to the head structure 42 due to use of the spring-loaded plunger-like rack portion 105-106 reciprocably displaced in response to engagement of the lower projecting end of the rack portion 105 against an inner periphery of a slotted stator means.

A similar retractable interlocking means for use on smaller polyphase stator winding apparatus and the like can be seen in another embodiment thereof illustrated by views of FIGURES 5 and 6 of the drawings. This interlocking means is generally indicated by numeral 110 and includes a substantially L-shaped bracket 111 held by fastening means 112 to a frame or main body 113 of a stator winding apparatus. The bracket 111 can include a pair of downwardly extending projections 114 and 115 which direct wiring through passages 116 and 117, respectively, thereof to a location radially inwardly from stator support means such as 74 relative to which a stator means 76 indicated in FIGURE 5 can be supported as noted earlier. A lower end of the bracket 111 has a passage 118 vertically therethrough. A nail-like rod or pin member 119 having an enlarged head portion 120 on one end thereof can move reciprocably up and down with a lower end 121 of the rod or pin portion 119 projecting through a passage or inner hollow core 122 of the shaft 66 which carries sprockets 67 and 68, for example. The extensions 114 and 115 having the passages 116 and 117, respectively, therethrough assure guidance of wiring W to one side of the rod or pin means 119 having sufficient weight included with the head portion 120 thereof to assure normal downward location and positioning by gravity to have the free end 121 of the rod or pin portion 119 engage a recess 124 of one wire guiding end portion 125 which can have a single pivotal finger means 126 as shown in FIGURE 5 in accordance with disclosure of FIGURES 1-3 of a copending application Ser. No. 18,125, filed Mar. 28, 1960, now Patent 3,129,900, Greene, issued Apr. 21, 1964, belonging to the assignee of the present invention. The lower end of the bracket 111 has a horizontal position such that upon movement of the winding head structure including the wire guiding shoe end portion 125 into a location immediately adjacent to a slotted stator means there is a retention of the head portion 120 carrying the rod or pin portion 119 such that the free end 121 thereof disengages from the recess 124. However, as soon as the wire winding head structure is moved away from the slotted magnetic stator core, the free end 121 can engage the recess 124 so as to centralize and interlock the otherwise rotatable wire winding guide portions which are journalled by the snorkel member mentioned earlier such that the wire winding and guiding shoe portion is prevented from free rotation during the time that the winding head structure is moved or indexed out of engagement with the slotted stator means. The fastening means 112 can provide for adjustment of the positioning of the bracket 111 so as to have proper interfit of the free end 121 and recess 124 peripherally and centrally thereof.

In FIGURES 7 and 8 of the drawings there can be seen further refinement and improvement of features for wire guiding end shoe portions to include a pair of separately pivotable hinge-like members generally indicated by numeral 130 and each having a substantially triangular main body portion 131 with a pair of stops 132 and 133 engageable against a central portion of a wire winding end guide portion suitably recessed to accommodate the triangular body portions 131 on right and left-hand sides thereof in a location remote from a guide edging such as 85 and 86 noted earlier. It is to be noted that the triangular main body portions 131 can be journalled by a suitable shaft or pin 134 for each side and such a pin or shaft 134 can have opposite ends thereof secured for journalling between the intermediate shoe portion 80 and end portion 81 at each of opposite sides or ends of the intermediate portion 80. Integral with the triangular main body portion 131 of each of the hinge-like members 130 there can be a substantially L-shaped extension 136 having a curved guide edge portion 137 which supplements the edging 85 on laterally opposite sides so as to complement each other on each of the shoe portions though the curved guide edge portion 137 of each of the hinge-like members 130 is pivotally displaceable during wire winding operation thereby to enhance generally even distribution of the wiring W into stator slots such as 77 of the stator means 76 noted earlier. These separately hinged pivotal members 130 provide specific structural improvement to aid in wire placement utilizing such hinged members disclosed generally in a copending application Ser. No. 145,417, Greene, filed Oct. 16, 1961, now Patent 3,129,901, Greene, issued Apr. 21, 1964, and based upon a parent disclosure of application Ser. No. 18,125, Greene, filed Mar. 28, 1960, now Patent 3,129,-900, Greene, issued Apr. 21 1964, as noted earlier. It is to be understood that the interlocking means disclosed in views of FIGURES 2 and 4 as well as 5 and 6 can be provided to prevent turning of winding head guide shoe portions about the axis of a snorkel or guide member with the provision of such pivotal members such as 130 on the end portions such as 81. Use of a recess of a conical configuration such as indicated by numeral 124, for example, in views of FIGURES 5 and 6 can be provided in a location intermediate the separately hinged pivotal members 130 each of which can terminate in a lower end 138 as a final guide for placement of wiring substantially evenly into stator slots.

It is to be noted that each stop portion 133 integral with the triangular main body portion 131 of each pivotable or wing-like member is adapted to be located immediately adjacent to an inner periphery of the slotted stator means so as to avoid displacement of the pivotable members 130 unless the winding head structure shifts away from engagement with the slotted stator means. As the winding head structure is shifted away from the slotted stator means, it is possible for the wiring per se to effect inward camming of the wing-like pivotable members 130 which can be displaced laterally toward each other thereby avoiding possible disengagement of wire previously placed into the slots such as 77. Thus, the improved slot fill in part is due to the fact that the wire guiding end portions equipped with such pivotal members will have resilience accomplished by placing a spring means 139 under tension. The ends 138 are normally biased laterally outwardly and away from each other due to provision of such spring means 139 attached at opposite ends to the triangular main body portions 131 in locations adjacent to the stops 132. Resilience of the coil spring means 139 is such that each of the pivotable members 130 can be temporarily displaced against bias of this spring means 139 thereby avoiding dislocation of any wire previously properly placed into a particular slot or pair of slots.

As further assurance against undesired displacement of conductor material or wiring already machine wound into particular slots, hold-down means generally indicated by numeral 140 in FIGURES 9 and 10 can be provided on a frame or base of stator winding apparatus that is relatively larger in size. This hold-down means can include support 141 on which a fluid actuator 142 is mounted to one side thereof and is adapted to have a suitable source of hydraulic fluid, compressed gas and the like connected thereto. Such pressurized fluid can effect displacement of an internal piston (not shown) carrying a rod 143 reciprocable thereby to effect movement of a triangular linkage including a three-cornered piece 144 having a pivot pin 145 interconnecting the rod and piece 144. Another corner of the triangular piece 144 can be articulated by a pivot pin 146 relative to an upper end of the support 141 and a third corner of the triangular piece 144 is journalled by a pivot pin 147 to a link 148 journalled at an opposite end by a pivot 149 to a free end of an arm 150 which is centrally journalled by a pivot 151. Movement of the rod 143 effects a rocking action of the triangular piece 144 about the axis of the pivot 146 such that the link 148 can move one end of the arm 150 upwardly and downwardly relative to an on-center position in which the arm 150 is substantially horizontally located. A spring means 152 can be coiled under tension between the pivot 151 and a top portion of the support 141. As indicated in the view of FIGURE 10, the arm 150 can be bifurcated so as to have a pair of opposite free ends 154 and 155 spanning a predetermined distance over end turns of conductor material or wiring fitted into a slotted stator. This hold-down means 140 can be mounted on a rear portion of the stator winding apparatus and can be adapted to hold coil end turns in place relative to the slotted magnetic stator core until wedges or pegs can be inserted to hold the conductor material or wiring in place in the slots.

For smaller stator winding apparatus another fluid actuated pivotal linkage coil hold-down means can be provided having features as shown in views of FIGURES 11 and 12 of the drawings. This modified coil hold-down means is generally indicated by numeral 160 and can be attached to a rear portion 161 of a frame or base of a stator winding apparatus by use of a bracket 162 and suitable fastening means 163. The bracket 162 can have a projection or extension thereof terminating in an end 164 provided with a pivot pin 165 to journal an arm 166 with a hook end 167 engageable as to an end turn of wiring W indicated in FIGURES 11 and 12. A rod 168 from an actuator 170 can be journalled by a pivot point 171 to the arm 166. The rod can be carried by a piston portion 172 reciprocable in a hollow interior of the actuator 170 to which fluid medium under pressure can be supplied by passages 173 and 175 at opposite ends thereof.

Also on polyphase stator winding apparatus it has been found that complete winding of each phase by machine operation can be accomplished more effectively with relatively uniform slot fill by providing a fluid actuated drift blade means for which reference is made to parent disclosure of Ser. No. 242,236, filed Dec. 4, 1962, now Patent 3,210,020, Greene et al., issued Oct. 5, 1965.

While the embodiments of the present invention constitute preferred forms, it is to be understood that other forms might be adopted.

What is claimed is as follows:

1. On a wire guiding shoe means for use with stator coil winding apparatus for winding wire coils in an annular stator core having slots with insulation therein, improved opposite wire guiding end structure, comprising, opposite end body portions each having diverging-tapered edging along sides thereof, a central projection having a pair of passages therein substantially parallel to each other, and a pair of headed pin means reciprocably mounted in the passages of each central projection to have at least one of said pin means on each end serve as a post around which end turns of wire coils form readily though the other of each pair of post means may be deflected upwardly by previously wound end turns of wire coils.

2. The end structure of claim 1 wherein said pin means are vertically located and substantially parallel to each other subject to downward biasing due to weight thereof per se.

3. On a wire guiding shoe means for use with stator coil winding apparatus for winding wire coils in an annular stator core having slots with insulation therein, improved opposite wire guiding end structure attached to an intermediate support portion and comprising, opposite end body portions each having diverging-tapered edging along sides thereof, a pair of side wing portions separately pivoted on said end portions including a curved laterally outer edge to complement said edging of said body portion and including at least one limit stop integral therewith to engage the intermediate support portion during winding operation though leaving said side wing portions pivotable toward each other when moved from the stator core so as to avoid disclocation of wound wire coils and to enhance slot fill.

4. The structure of claim 3 wherein each side wing portion is substantially L-shaped in configuration and includes a substantially triangular pivotal body portion integral therewith as journalled in a location between said end and intermediate portions.

5. The structure of claim 3 wherein each side wing portion is substantially L-shaped in configuration and includes a substantially triangular pivotal body portion integral therewith as journalled in a location between said end and intermediate portions, said triangular pivotal body portion having a pair of limit stops formed thereby to control amount of lateral movement in opposite directions.

6. Wire guiding shoe means for use in a machine for winding coils on a stator core, said guiding shoe means having oppositely disposed end portions, a pair of wing members pivotally mounted on each of said end portions, each of said wing members having a curved outer edge, stop means integral with each of said wing members for limiting the pivotal separation of the wing members of each pair, a pair of parallel, vertically oriented pin means reciprocably mounted on each of said end portions substantially intermediate the wing members of a pair.

References Cited by the Examiner

UNITED STATES PATENTS

| | | | |
|---|---|---|---|
| 2,875,718 | 3/1959 | Bieri et al. | 269—25 |
| 2,914,977 | 12/1959 | Verderber | 269—25 |
| 2,967,346 | 1/1961 | McMaster et al. | 242—1.1 |
| 2,988,291 | 6/1961 | Greene et al. | 242—1.1 |
| 3,129,900 | 4/1964 | Greene | 242—1.1 |
| 3,129,901 | 4/1964 | Greene | 242—1.1 |

FOREIGN PATENTS 347,570   7/1960   Switzerland.

STANLEY N. GILREATH, *Primary Examiner.*

MERVIN STEIN, *Examiner.*

B. S. TAYLOR, *Assistant Examiner.*